United States Patent
Shiobara et al.

(10) Patent No.: US 12,098,290 B2
(45) Date of Patent: Sep. 24, 2024

(54) LOW DIELECTRIC SILICA POWDER, RESIN COMPOSITION CONTAINING THE SILICA POWDER, AND METHOD FOR MANUFACTURING LOW DIELECTRIC SILICA POWDER

(71) Applicant: SHIN-ETSU CHEMICAL CO., LTD., Tokyo (JP)

(72) Inventors: Toshio Shiobara, Annaka (JP); Hajime Itokawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/321,827

(22) Filed: May 17, 2021

(65) Prior Publication Data

US 2021/0371666 A1  Dec. 2, 2021

(51) Int. Cl.
*C09C 1/30* (2006.01)
*C01B 33/18* (2006.01)
*C08K 3/36* (2006.01)

(52) U.S. Cl.
CPC ............ *C09C 1/3045* (2013.01); *C01B 33/18* (2013.01); *C08K 3/36* (2013.01); *C01P 2004/03* (2013.01); *C01P 2004/61* (2013.01); *C01P 2004/62* (2013.01); *C01P 2006/40* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 5,202,104 A | 4/1993 | Watanabe et al. | |
| 2020/0058577 A1* | 2/2020 | Yoshida | .............. C09J 11/08 |
| 2020/0189922 A1 | 6/2020 | Watanabe et al. | |
| 2020/0190332 A1 | 6/2020 | Watanabe et al. | |
| 2023/0147757 A1 | 5/2023 | Okabe et al. | |

FOREIGN PATENT DOCUMENTS

| | | |
|---|---|---|
| JP | H02-289416 A | 11/1990 |
| JP | H03-050113 A | 3/1991 |
| JP | H05-170483 A | 7/1993 |
| JP | 2004-203664 A | 7/2004 |
| JP | 2012-006783 A | 1/2012 |
| JP | 6564517 B1 | 8/2019 |
| JP | 2021-178770 A | 11/2021 |

(Continued)

OTHER PUBLICATIONS

English translation of Yougen et al. JP 2005-119884 (Year: 2005).*

(Continued)

*Primary Examiner* — Ronak C Patel
(74) *Attorney, Agent, or Firm* — Oliff PLC

(57) ABSTRACT

The present invention is a low dielectric silica powder, which has an average particle size of 0.1 to 30 μm and a dielectric loss tangent of 0.0005 or less at 10 GHz. An object is to provide: a silica powder with an extremely small dielectric loss tangent; a resin composition containing the same; and a method for manufacturing a silica powder with a low dielectric loss tangent and strong adhesion at the interface to resin.

3 Claims, 2 Drawing Sheets

(56) References Cited

FOREIGN PATENT DOCUMENTS

WO    2005-119884    *    5/2005

OTHER PUBLICATIONS

Hitoshi Asano; "Change in OH Group Concentration in Silica Glass Accompanying Heat Treatment"; University of Fukui; (2011).
Kenji Fujii; "Structural Change in Silica Glass Block Due to Heat Treatment"; University of Fukui; (2005).
Apr. 4, 2023 Notification of Reasons for Refusal issued in Japanese Patent Application No. 2020-096051.
Oct. 24, 2023 Office Action issued in Japanese Patent Application No. 2020-096051.

* cited by examiner

[FIG. 1]
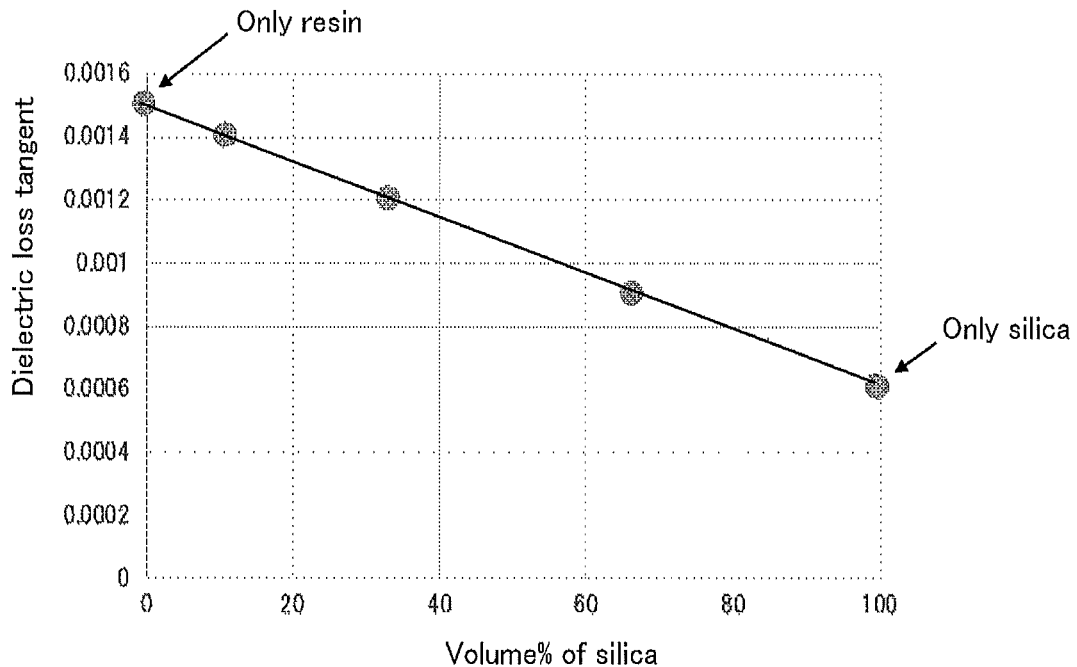
[FIG. 2]
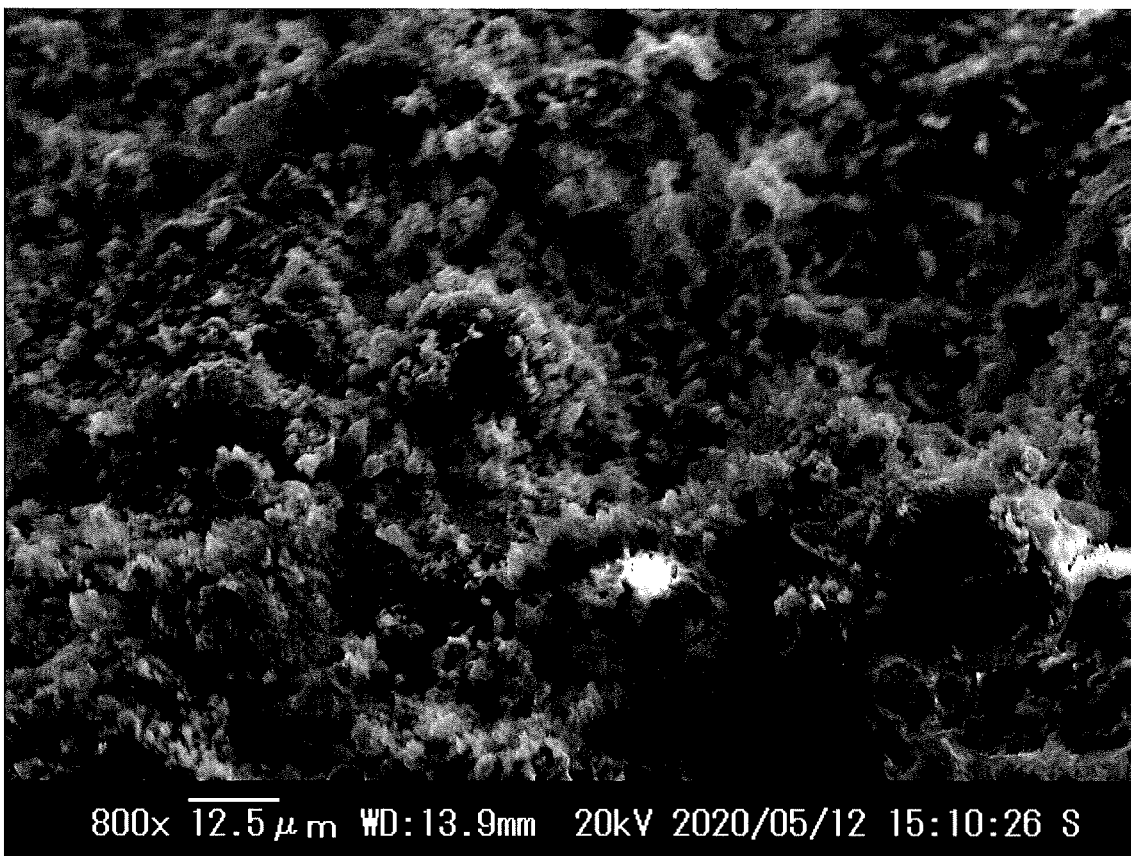

[FIG. 3]
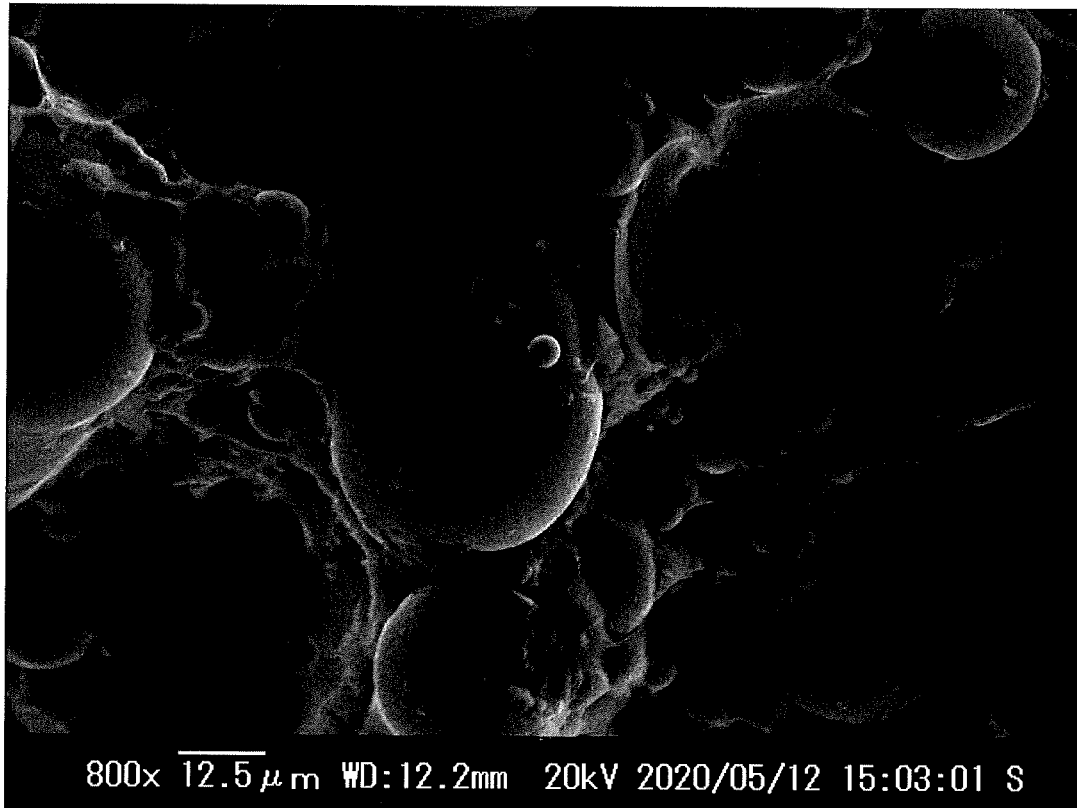
[FIG. 4]
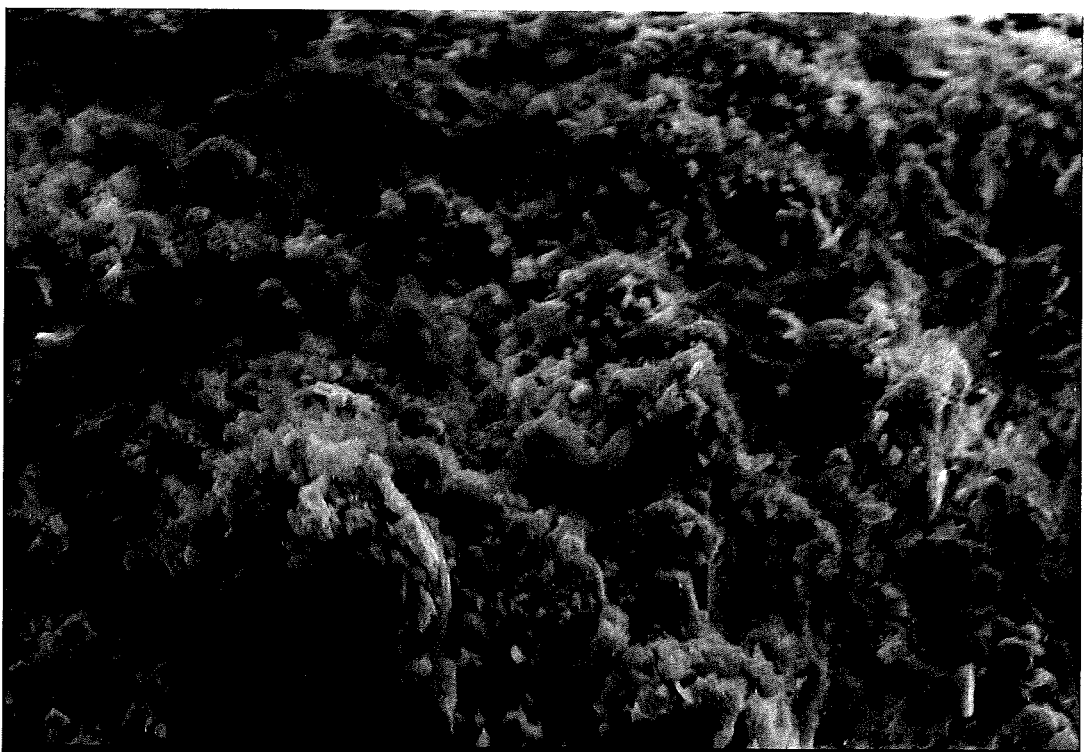

LOW DIELECTRIC SILICA POWDER, RESIN COMPOSITION CONTAINING THE SILICA POWDER, AND METHOD FOR MANUFACTURING LOW DIELECTRIC SILICA POWDER

TECHNICAL FIELD

The present invention relates to: a silica powder with extremely small dielectric characteristics, in particular, an extremely small dielectric loss tangent in a high frequency region; a method for manufacturing the same; and a resin composition containing the silica powder.

BACKGROUND ART

Presently, with higher performance and higher-speed communication of information terminals such as smartphones, encapsulants for semiconductors used such as printed circuit boards and underfill materials are strongly desired to have lower dielectric characteristics, in particular, lower dielectric loss tangent as well as higher density and to be extremely thin.

As shown by the Edward A. Wolff formula: transmission loss~(is proportional to) $\sqrt{\varepsilon} \times \tan \delta$, it is known that a material having a smaller dielectric constant ($\varepsilon$) and dielectric loss tangent (tan $\delta$) can suppress the transmission loss of a signal. In particular, as seen from the above formula, it is known that dielectric loss tangent (tan $\delta$) greatly contributes to transmission loss.

As a means to reduce the dielectric loss tangent of encapsulants for semiconductors such as printed circuit boards and underfill materials, it is common to add an inorganic powder, having a lower dielectric loss tangent than resin. However, hardly any inorganic powders with a dielectric loss tangent of 0.0006 or less and a dielectric constant of 4.0 or less are known in a high frequency region.

Silica powder, being a typical, widely used inorganic powder, has a small expansion coefficient, and is also a material excellent in insulation and dielectric characteristics as an inorganic powder for adding into resin.

If the dielectric characteristics, in particular, dielectric loss tangent of silica powder can be lowered to the intrinsic level of quartz glass, it can be considered that silica powder can be developed for a wide variety of uses as encapsulants for semiconductors for high-speed communication and the like, and as fillers for substrates for high-speed communication, antenna substrates, and the like, which are expected to be greatly developed hereafter. However, such a silica powder has not yet been found.

In Patent Document 1, a low-silanol silica is manufactured by a heat treatment in an atmosphere with a low water-vapor partial pressure. However, only the reduction rate of the number of the silanol groups is mentioned, and the silanol amount of the heat-treated silica is not measured. Moreover, there is no mention of the dielectric loss tangent.

In Patent Document 2, a silica glass fiber manufactured by a sol-gel process is heat-treated to manufacture a silica glass fiber with a water content of 1000 ppm or less. There is a reference to the water content of the heat-treated silica glass fiber, but there is no mentions of the silanol amount or the dielectric loss tangent.

In addition, the relationship between the amount of water in the silica glass fiber and the dielectric loss tangent is shown, but there is no reference to the silanol (Si—OH) amount. Furthermore, since the dielectric loss tangent is a value measured using a printed substrate which contains a silica glass fiber and PTFE, thus the correlation between the silanol amount and the dielectric loss tangent of the glass fiber is not clarified.

Generally, regarding quartz glass, there is a correlation between the number of hydroxy groups (OH groups) remaining in the glass and the dielectric loss tangent. In addition, it is known that the number of hydroxy groups are reduced by a high-temperature treatment, and the structure of the quartz glass changes (Non Patent Document 1). However, distortion is increased if a hydroxy-group-containing quartz glass is heat-treated at a high temperature, and the distortion is increased particularly on the glass surface (Non Patent Document 2), thus strength is greatly degraded. Therefore, heat-treated silica powder that can be used for a filler where adhesive strength with resin is important has not been put to practical use.

CITATION LIST

Patent Literature

Patent Document 1: JP H2-289416 A
Patent Document 2: JP H5-170483 A

Non Patent Literature

Non Patent Document 1: Change in OH Group Concentration in Silica Glass Accompanying Heat Treatment, February, 2011, University of Fukui, Graduate School of Engineering, Thesis for Master's Program Non Patent Document 2: Structural Change in Silica Glass Block Due to Heat Treatment, February, 2005, University of Fukui, Graduate School of Engineering, Thesis for Master's Program

SUMMARY OF INVENTION

Technical Problem

The present invention has been made to solve the above-described problems, and an object thereof is to provide: a silica powder with an extremely small dielectric loss tangent; and a resin composition containing the same. Furthermore, another object is to provide a method for manufacturing a silica powder with a low dielectric loss tangent and strong adhesion at the interface to resin.

Solution to Problem

To solve the above-described problems, the present invention provides a low dielectric silica powder, which has an average particle size of 0.1 to 30 μm and a dielectric loss tangent of 0.0005 or less at 10 GHz.

Such a silica powder has an extremely small dielectric loss tangent. Therefore, the silica powder can be developed for a wide variety of uses as encapsulants for semiconductors for high-speed communication and the like, and as fillers for substrates for high-speed communication, antenna substrates, and the like.

In this event, the low dielectric silica powder preferably has, inside and on a surface thereof, 200 ppm or less of a metal and/or a metal oxide in terms of a mass of each metal, the metal selected from aluminum, magnesium, and titanium, and 10 ppm or less of an alkali metal and an alkaline earth metal in terms of a mass of each.

Such a silica powder has no risk of eroding electrodes.

In addition, hydroxy group (Si—OH) content of the low dielectric silica powder is preferably 300 ppm or less.

Such a silica powder has an even lower dielectric loss tangent.

Furthermore, boron content is preferably 1 ppm or less, phosphorus content is preferably 1 ppm or less, and uranium and thorium contents are preferably each 0.1 ppb or less.

Such a silica powder has favorable dielectric characteristics, and can also prevent malfunction due to radiation.

In addition, in the present invention, the low dielectric silica powder preferably has a maximum particle size of 100 μm or less.

As described, the silica powder is preferably used with coarse particles and aggregated particles of more than 100 μm removed.

In addition, the present invention provides a low dielectric silica powder-containing resin composition, being a mixture of the above-described low dielectric silica powder and a resin.

Such a low dielectric silica powder-containing resin composition can give a cured material with an extremely small dielectric loss tangent.

Furthermore, the present invention provides a method for manufacturing a low dielectric silica powder, including:

heat-treating a silica powder at a temperature of 500° C. to 1500° C. to achieve 0.0005 or less of a dielectric loss tangent of the silica powder at 10 GHz; and etching a surface of the heat-treated silica powder with an etching solution.

According to such a method for manufacturing a low dielectric silica powder, a low dielectric silica powder with a low dielectric loss tangent, high strength, and strong adhesion at the interface to resin can be manufactured with high productivity.

In this case, the heat treatment is preferably performed for 30 minutes to 72 hours.

By performing the heat treatment in this manner, the dielectric loss tangent of the low dielectric silica powder can be made a suitable value.

Furthermore, an aqueous solution is preferably used as the etching solution, and the aqueous solution selected from an aqueous hydrofluoric acid solution, an aqueous ammonium fluoride solution, an aqueous sodium hydroxide solution, an aqueous potassium hydroxide solution, an aqueous sodium carbonate solution, ammonia water, and alkaline electrolyzed water.

Such an etching solution is desirable from aspects of the effect of removing a strained layer of the heat-treated silica powder and improving the adhesion with resin.

In this case, as the etching solution, a basic aqueous solution with a pH of 11 or higher is preferably used, and more preferably alkaline electrolyzed water with a pH of 12 or higher is used.

Such etching solutions are more preferably from aspects of the effect of etching the silica powder and improvement of adhesion with resin, and from aspects of working environment and wastewater treatment, alkaline electrolyzed water with a pH of 12 or higher is further preferable.

The present invention preferably further comprises treating the etched surface of the silica powder with a coupling agent.

By coating the surface of the silica powder with a silane coupling agent in this manner, the adhesion between resin and the powder surface can be made stronger when the silica powder is blended in resin or the like.

Advantageous Effects of Invention

As described above, the inventive low dielectric silica powder can achieve an extremely small dielectric loss tangent, and a low dielectric silica powder-containing resin composition, being a mixture of the low dielectric silica powder and a resin can give a cured material with an extremely small dielectric loss tangent. In addition, according to the inventive method for manufacturing a low dielectric silica powder, a silica powder with a low dielectric loss tangent, high strength, and strong adhesion at the interface to resin can be manufactured with excellent productivity.

BRIEF DESCRIPTION OF DRAWINGS

FIG. 1 is a graph showing the relation between the loaded amount of silica and the dielectric loss tangent at 10 GHz.

FIG. 2 is a scanning electron microscope photograph of a broken-out section obtained by breaking a cured material of Example 5.

FIG. 3 is a scanning electron microscope photograph of a broken-out section obtained by breaking a cured material of Example 6.

FIG. 4 is a scanning electron microscope photograph of a broken-out section obtained by breaking a cured material of Comparative Example 4.

DESCRIPTION OF EMBODIMENTS

As described above, development of a silica powder with an extremely small dielectric loss tangent has been desired.

The present inventors have earnestly studied the above-described problems, in particular, studied the achievement of low dielectricity, and found out that heating a silica powder at a temperature of 500° C. to 1500° C. is effecting for lowering dielectric loss tangent, and that by further slightly etching the silica powder surface to obtain an etched silica powder, the powder surface becomes strong and adhesion to resin is improved. Thus, the present invention has been completed.

That is, the present invention is a low dielectric silica powder, which has an average particle size of 0.1 to 30 μm and a dielectric loss tangent of 0.0005 or less at 10 GHz.

In addition, the present invention is a method for manufacturing a low dielectric silica powder, including:

heat-treating a silica powder at a temperature of 500° C. to 1500° C. to achieve 0.0005 or less of a dielectric loss tangent of the silica powder at 10 GHz; and etching a surface of the heat-treated silica powder with an etching solution.

Hereinafter, the present invention will be described in detail, but the present invention is not limited thereto.

The present invention relates to a silica powder, which has an average particle size of 0.1 to 30 μm, the silica powder having a dielectric loss tangent of 0.0005 or less at 10 GHz. In addition, the present invention relates to a silica powder preferably having, inside and on a surface of the silica powder, 200 ppm or less of a metal and/or a metal oxide in terms of a mass of each metal, the metal selected from aluminum, magnesium, and titanium, and containing 10 ppm or less of an alkali metal and an alkaline earth metal in terms of a mass of each. In addition, the present invention relates to a silica powder with a hydroxy group (Si—OH) content of 300 ppm or less. Furthermore, the present invention relates to a silica powder with an average particle size of 0.1 to 30 μm, preferably with a maximum particle size of 100 μm or less.

The present invention is further related to a method for manufacturing a silica powder with a dielectric loss tangent of 0.0005 or less, preferably 0.0004 or less at 10 GHz by heat-treating the silica powder at a temperature of 500° C. to 1500° C. By performing the heat treatment, the hydroxy group (Si—OH) content contained in the silica powder preferably becomes 300 ppm or less, more preferably 280 ppm or less, further preferably 150 ppm or less, and a silica powder with a characteristic of a low dielectric loss tangent can be achieved. This silica powder is suitable for encapsulants for semiconductors and fillers for substrates such as high-speed communication substrates, and antenna substrates.

Such a silica powder having excellent dielectric characteristics can facilitate giving a low dielectric resin composition by blending into a resin. In addition, the low dielectric silica powder is also useful as a filler for a low dielectric organic substrate.

A silica powder to be a raw material for the inventive low dielectric silica powder can be exemplified with a fused silica powder obtained by pulverizing a naturally produced crystalline quartz and making the resulting powder pass through a flame with a high temperature of about 2000° C. to form into a spherical shape; a silica powder obtained by purifying a raw material of water glass, sintering at a high temperature, and pulverizing; and the like. However, any silica powder can be used as long as it is a silica powder regardless of the above-described production methods. Usually, a silica powder with the target dielectric loss tangent of 0.0005 or less cannot be obtained even with a silica powder treated at a high temperature of about 2000° C. that is easily available as a filler for encapsulants for semiconductors or the like.

According to the experiment results of the present inventors, when the silica powder to be heat-treated contains, inside and on a surface of the particles, 200 ppm or less of a metal or a metal oxide in terms of the mass of each metal, the metal selected from aluminum, magnesium, and titanium, the silica powder is not easily crystallized in the step of heat-treating, and a silica powder with the target low dielectricity can be obtained. In addition, the contained amounts of alkali metal and alkaline earth metal are preferably 10 ppm or less each, more preferably 5 ppm or less. A silica powder with a large amount of alkali metal and alkaline earth metal has a problem of eroding electrodes of high-speed communication substrates and semiconductor devices, and a silica powder with little alkali metal and alkaline earth metal is required from the viewpoint of preventing erosion. Furthermore, in the silica powder, B (boron) content is preferably 1 ppm or less, P (phosphorus) content is preferably 1 ppm or less, and furthermore, to prevent malfunction due to radiation, U and Th contents are preferably 0.1 ppb or less. In this manner, by keeping the impurity concentrations low, dielectric characteristics, etc. of the silica powder become more favorable. The concentrations of the above impurities can be measured by atomic absorption spectrophotometry, inductively coupled plasma (ICP) emission spectroscopy, or the like.

Note that in the present invention, alkali metal refers to the elements of group 1 of the periodic table excluding hydrogen: lithium, sodium, potassium, rubidium, cesium, and francium. Meanwhile, alkaline earth metal refers to the elements of group 2 of the periodic table excluding beryllium and magnesium: calcium, strontium, barium, and radium.

The inventive silica powder has an average particle size of 0.1 to 30 μm. In addition, as an encapsulant for a semiconductor, the shape of the powder is preferably spherical since high filling to a resin can be achieved, but a powder with a crushed shape can also be used. If the average particle size is less than 0.1 μm, the specific surface area becomes large, and high filling to a resin cannot be achieved. Meanwhile, if the average particle size is more than 30 μm, filling property to a narrow portion becomes poor, and faults such as being unfilled occur. Therefore, a silica powder with an average particle size of 0.5 μm to 20 μm and a maximum particle size of 100 μm or less is generally preferable.

When the silica powder is used as an underfill material or a filler for a high-speed communication substrate, the average particle size is preferably 0.1 to 5 μm and the maximum particle size is preferably 20 μm or less, more preferably the average particles size is 0.1 to 3 μm and the maximum particle size is 10 μm or less.

To improve characteristics such as flowability and workability, the inventive low dielectric silica powder may have silica powders of different average particle sizes blended.

Note that in the present invention, the maximum particle size and the average particle size can be measured by a laser diffraction type particle size distribution measurement apparatus (for example, SALD-3100 manufactured by Shimadzu Co., etc.), and the average particle size can be determined as a mass-average value D50 (that is, a particle size or a median diameter when a cumulative mass is 50%) in the particle size distribution measurement by a laser diffraction method.

The inventive low dielectric silica powder is given a dielectric loss tangent of 0.0005 or less at 10 GHz, so that the silica powder can be developed for a wide variety of uses as an encapsulant for semiconductors for high-speed communication, etc. and as a filler for substrates for high-speed communication or antenna substrates and the like. Accordingly, in order to achieve such a dielectric loss tangent, the silica powder is heat-treated beforehand.

The heating temperature for achieving low dielectricity is 500° C. to 1500° C., more preferably 600° C. to 1300° C., and further preferably 700° C. to 1000° C. As a heating method, a silica powder is placed in an electric heating furnace, a muffle furnace, or the like, and heat-treated at 500° C. to 1500° C.

The heating time of the silica powder varies depending on the heating temperature, and for practicality, 30 minutes to 72 hours is preferable, more preferably 1 hour to 24 hours, further preferably 2 hours to 12 hours.

Note that the cooling to room temperature after heating can be either slow or rapid. However, depending on conditions, the heating temperature and cooling conditions are preferably optimized since silica in a molten state sometimes partially crystallizes.

The heating atmosphere is not particularly limited, and can be in air or in an inert gas such as nitrogen under normal or reduced pressure, or in a vacuum. However, heating is usually performed under normal pressure in air considering cost, etc.

By analyzing the hydroxy group content of the heat-treated silica powder by infrared spectroscopy, it can be determined whether the desired dielectric characteristics have been achieved.

It is known that in a GHz band, dipole caused by polarization responds to an electric field, and dielectric properties appear. For this reason, in order to achieve low dielectric characteristics in a GHz band, it is important to reduce polarization in a structure.

The dielectric constant is represented by the following Clausius-Mossotti formula, and molecular polarizability and molar volume are factors. Accordingly, reducing polarizability, and increasing molar volume are important in achieving a low dielectric constant.

$$\text{Dielectric constant} = [1 + 2(\Sigma Pm/\Sigma Vm)]/[1 - (\Sigma Pm/\Sigma Vm)]$$

(Pm: molecular polarizability of atomic group, Vm: molar volume of atomic group)

In addition, the dielectric loss tangent (tan δ) is a delay in dielectric response to an alternating-current electric field, and in a GHz band, the orientation relaxation of a dipole is the main factor. Accordingly, in order to reduce dielectric loss tangent, a method of eliminating the dipole (achieving a structure close to being nonpolar) can be considered.

From the above, the present invention aims to suppress the concentration of hydroxy groups (silanol) being a polar group, as an approach to reducing the dielectric characteristics of silica particles in a GHz band.

From the above viewpoints, the hydroxy group (Si—OH) concentration in the heat-treated silica powder is preferably within the above range in the present invention. In addition, the hydroxy group concentration in the heat-treated silica powder is preferably low, so that the strained layer on the silica powder surface can be dissolved and removed in the etching treatment described below.

In this way, a silica powder with an even lower dielectric loss tangent can be obtained. The hydroxy group concentration in the silica powder obtained in the end is preferably 300 ppm or less, more preferably 280 ppm or less, further preferably 150 ppm or less.

As described below, the hydroxy group (Si—OH) concentration in the silica powder can be quantified by measuring the transmittance of a peak near 3680 $cm^{-1}$ by infrared spectroscopic analysis. In this method, since infrared absorption near 3680 $cm^{-1}$ is assigned to inner silanol (see Patent Document 1), silanol, being a polar group that affects dielectric loss tangent, is identified and quantified on the basis of this characteristic absorption band. In this manner, the degree of the reduction of the dielectric loss tangent can be estimated more specifically. Note that since the infrared absorption of the isolated silanol assigned near 3740 $cm^{-1}$ (see Patent Document 1) is a negligible level in the present invention, the reduction of dielectric loss tangent can be estimated sufficiently by measuring the transmittance of only the peak near 3680 $cm^{-1}$.

As mentioned above, the transmission loss of a signal can be suppressed with a material with a smaller dielectric constant (ε) and dielectric loss tangent (tan δ) as shown by the Edward A. Wolff formula: transmission loss~(is proportional to) $\sqrt{\varepsilon} \times$ tan δ. In particular, regarding transmission loss, dielectric loss tangent (tan δ) contributes greatly. Therefore, a lower dielectric loss tangent is desired.

By the heat treatment of the present invention, a dielectric loss tangent of 0.0005 or less, being the intrinsic level of quartz powder, can be achieved. The dielectric loss tangent is more preferably 0.0004 or less, further preferably 0.0002 or less.

The heat-treated silica powder sometimes contains fused silica powder depending on the treatment temperature, and is therefore disintegrated using a disintegrator such as a ball mill, and then coarse particles and aggregated particles of more than 100 μm are removed with a sieve, and the resulting silica powder is used. Such a removal of coarse particles can be performed using a 150-mesh sieve.

However, since a strained layer is liable to be formed on the silica powder surface when treated at a high temperature, a cured material of a resin composition having such a silica powder loaded tends to have degraded strength. The strained layer on the silica powder surface can be easily removed by immersing in an etching solution or the like.

As the etching solution, the following aqueous solutions can be employed: an acidic aqueous solution such as an aqueous hydrofluoric acid solution, and a basic aqueous solution selected from an aqueous ammonium fluoride solution, an aqueous sodium hydroxide solution, an aqueous potassium hydroxide solution, an aqueous sodium carbonate solution, ammonia water, and alkaline electrolyzed water, etc. As an acidic aqueous solution, an aqueous ammonium acid fluoride ($NH_4F \cdot HF$) solution, or an aqueous potassium acid fluoride ($KHF_2$) solution can also be used. From aspects of working environment and wastewater treatment, a basic aqueous solution, in particular, alkaline electrolyzed water is more preferable.

Regarding the etching conditions of the heat-treated silica powder, the temperature is preferably room temperature (23° C.) to 100° C., more preferably 40° C. to 80° C. Treatment time depends on etching rate of the silica surface at the treatment temperature, for example, room temperature to 90° C., preferably 40° C. to 80° C., and is therefore not particularly limited. The lower the temperature of the etching solution, the less the etching progresses, and the higher the temperature, the faster the etching rate. Accordingly, for practical purposes, a temperature at which the treatment can be completed in 10 minutes or more to 168 hours is preferable. The treatment time is preferably 1 hour to 72 hours, more preferably 10 hours to 24 hours. In addition, under atmospheric pressure or pressurized atmosphere, the treatment can be performed within the ranges of the above temperature and time.

The pH of the etching solution is not particularly limited as long as the strained layer can be removed, and can be adjusted by adding an acid or a base, for example, as necessary.

When a basic solution has the pH of 8.0 or higher, the etching effect on the silica powder is sufficient, and an improvement in adhesion between resin and the etched silica powder surface can be observed. The pH is preferably 10.0 to 13.5, more preferably 11.0 to 13.0.

As a basic etching solution, a basic aqueous solution with a pH of 11 or higher is preferably used, and more preferably, alkaline electrolyzed water with a pH of 12 or higher is used.

In addition, by etching, sharp edges, etc. on the powder surface are reduced in a powder that is insufficiently crushed or made spherical, and therefore etching is effective for achieving high filling or reducing local stress.

After completion of the etching, the silica powder is separated by a technique such as filtration, and is further repeatedly washed with ion-exchanged water or pure water until the washing water becomes neutral. After washing, the silica powder is separated by filtration or centrifugation or the like, and is dried at a temperature of 100° C. to 200° C. to remove water. Usually, silica powder becomes aggregated when drying to remove water, and is therefore disintegrated using a disintegrator such as a ball mill. If the aggregation due to the drying is strong, aggregation can be prevented by washing with an alcohol such as methanol after washing with ion-exchanged water, separating the silica powder by filtration or centrifugation or the like, and the drying.

The low dielectric silica powder obtained in this manner is rid of coarse particles and aggregated particles of over 100 μm with a sieve (for example, a 150-mesh sieve), and then used.

The treatment with a coupling agent is a step that is performed as necessary, and is a step of treating the silica powder surface with a coupling agent or the like. The coupling agent is not particularly limited, but a silane coupling agent is preferable.

The surface treatment with the silane coupling agent is for making the adhesion between resin and the low dielectric silica powder surface strong when manufacturing a resin composition, etc. This is achieved by washing and drying the low dielectric silica powder subjected to a high-temperature treatment and an etching treatment, and then coating the surface of the silica powder with the silane coupling agent.

As the silane coupling agent, a known silane coupling agent can be used. Alkoxysilane is preferable, and one or more selected from a group including γ-aminopropyltrimethoxysilane, γ-aminopropyltriethoxysilane, N-(β-aminoethyl)-γ-aminopropyltrimethoxysilane, N-(β-aminoethyl)-γ-aminopropyltriethoxysilane, γ-methacryloxypropyltrimethoxysilane, γ-methacryloxypropyltriethoxysilane, and trifluoropropyl trimethoxysilane are more preferable.

The silane coupling agent is usually used as a diluted aqueous solution at a concentration of 0.1 mass % to 5 mass %, but it is particularly effective to use at 0.1 mass % to 1 mass %. In this way, the silane coupling agent adheres uniformly, and brings a more uniform protection effect to the silica powder surface so that handling becomes easy. Moreover, the silica powder can also be blended uniformly without unevenness in resin that is used when fabricating a substrate or the like.

The above-described silica powder with the lowered dielectric loss tangent can be blended in a thermosetting resin or a thermoplastic resin as a filler for an epoxy resin, a silicone resin, a polyimide resin, a Teflon (registered trademark) resin, a maleimide resin, and a polyphenylene ether resin, etc.

A low dielectric silica powder-containing resin composition, being such a mixture of a low dielectric silica powder and a resin can provide a cured material with an extremely small dielectric loss tangent. In particular, by blending a silica powder subjected to an etching treatment (etched silica powder), the distortion in the silica powder surface is eliminated and the silica powder is made stronger, and the adhesive strength between resin and silica powder can be further improved.

A low dielectric silica powder obtained in this manner is a material useful for encapsulants of semiconductor devices for high-speed communication, etc. and fillers or the like of low dielectric organic substrates for servers and antennas, which are expected to grow considerably hereafter.

EXAMPLE

Hereinafter, the present invention will be specifically described with reference to Examples and Comparative Examples. However, the present invention is not limited thereto.

Note that in the present description, the values of the dielectric loss tangent and the hydroxy group content of the silica powder prepared in the Examples and Comparative Examples are values determined by the following methods.
<Method for Measuring Dielectric Loss Tangent>

A method for measuring dielectric loss tangent will be described with a silica powder A1 (RS8225, untreated product) as an example.

In the proportion shown in the following Table 1, the silica powder was mixed in an anisole solvent containing SLK-3000 (manufactured by Shin-Etsu Chemical Co., Ltd.), being a low dielectric maleimide resin and as a curing agent, dicumyl peroxide (Percumyl D manufactured by NOF Corporation), being a radical polymerization initiator. This was dispersed and dissolved to prepare a varnish.

The silica powder was added so as to be 0%, 11.1%, 33.3%, and 66.7% relative to the resin by volume %, spread to a thickness of 200 mm with a bar coater, placed in a dryer at 80° C. for 30 minutes to remove the anisole solvent. Thus, an uncured maleimide resin composition was prepared.

TABLE 1

| | Volume % of Silica powder | | | |
|---|---|---|---|---|
| Blended amount (volume %) | 0 | 11.1 | 33.3 | 66.7 |
| Silica powder (parts by mass) | 0 | 25 | 100 | 400 |
| SLK-3000 (parts by mass) | 100 | 100 | 100 | 100 |
| Dicumyl peroxide (parts by mass) | 2.0 | 2.0 | 2.0 | 2.0 |
| Anisole solvent (parts by mass) | 66.7 | 72.0 | 100.0 | 150.0 |

The prepared uncured maleimide resin composition was placed in a mold of 60 mm×60 mm×100 μm, cured with a hand press at 180° C. for 10 minutes at 30 MPa, and then completely cured in a dryer at 180° C. for 1 hour to fabricate a cured resin sheet. The cured resin sheet was cut to a size of 50 mm×50 mm, and the dielectric loss tangent at 10 GHz was measured using SPDR (Split post dielectric resonators) dielectric resonator (manufactured by Keysight Technologies) for measuring dielectric constant at a frequency of 10 GHz.

A line of the volume % of the silica powder against the dielectric loss tangent was made from the plot obtained by plotting the values of the given dielectric loss tangent with the volume % of the silica powder on, the horizontal axis and the measured dielectric loss tangent on the vertical axis as shown in FIG. 1. This line was extrapolated, and the dielectric loss tangent at 100% silica powder was taken as the value of the dielectric loss tangent of silica powder.

There is a measuring apparatus that is said to be able to measure silica powder directly, but since measurement is performed with the silica powder loaded in a measurement pot, it is difficult to get rid of the air that is mixed in. In particular, measurement is even more difficult with silica powder having a large specific surface area since the mixed air has a great influence. Accordingly, to eliminate the influence of mixed in air and obtain a value in a state close to the mode for actual use, the dielectric loss tangent of the silica powder was determined by the above-described measuring method in the present invention.
<Method for Measuring Hydroxy Group (Si—OH) Content>

A sample with a silica powder loaded to the edge of an aluminum pan with a thickness of 1.5 mm was prepared. The transmittance T of a peak near 3680 cm$^{-1}$, being derived from hydroxy groups, in the infrared absorption spectrum of the sample was measured by a diffused reflection method using a Fourier transform infrared spectrophotometer (IRAffinity-1S) and a diffused reflection measurement apparatus (DRS-8000A). On the basis of the obtained transmittance, the absorbance A was determined by applying Lambert-Beer's law shown below.

Absorbance $A = -\text{Log}_{10} T$

T=transmittance near 3680 cm$^{-1}$

Next, the molarity C (mol/L) of hydroxy groups was determined with the following formula from the absorbance determined by the above formula.

$C = A/\varepsilon L$

ε: molar absorption coefficient (molar absorption coefficient of hydroxy groups ε=77.5 dm$^3$/mol·cm)

C: molarity (mol/L)

L: thickness of sample (optical path length) (1.5 mm)

The molarity C was determined from the obtained absorbance A by using the above formula.

The hydroxy group content (ppm) in the silica powder was determined with the following formula using the obtained molarity C.

Hydroxy group content (ppm)=$\{(C \times M)/(d \times 1000)\} \times 10^6$

Relative density of silica powder d=2.2 g/cm$^3$

Molecular weight of hydroxy group M (Si—OH)=45 g/mol

Examples 1 to 4 and Comparative Examples 1 to 3

A resin composition was prepared in the following manner, and the dielectric loss tangent of a cured material of the obtained resin composition was measured. Tables 2 and 3 show the results.

Example 1

5 Kg of a silica powder A1 (RS8225 manufactured by Tatsumori Ltd.) with an average particle size of 15 μm, a dielectric loss tangent of 0.0006, and a hydroxy group content of 370 ppm was placed in an alumina container and heated in a muffle furnace (manufactured by AS ONE Corporation) in air at 900° C. for 5 hours, and then cooled to room temperature over 6 hours. The silica powder after the heat treatment was placed in a plastic container containing 20 liters of alkaline electrolyzed water with a pH of 13 and stirred for 2 hours while heating to 60° C. in order to remove a strained layer on the particle surface. Subsequently, the silica powder was separated with a centrifugal separator, then washed with methanol and dried. The dried silica powder was disintegrated with a ball mill, and coarse particles were eliminated with a 150-mesh sieve. The resulting silica powder LK-1 had a reduced hydroxy group content of 270 ppm, and the dielectric loss tangent was 0.0002.

Example 2

5 Kg of a silica powder B (SO-E5 manufactured by ADMATECHS) with an average particle size of 1.5 μm, a dielectric loss tangent of 0.0011, and a hydroxy group content of 290 ppm was placed in an alumina container and heated in a muffle furnace (manufactured by AS ONE Corporation) in air at 900° C. for 12 hours, and then cooled to room temperature over 6 hours. The silica powder after the heat treatment was placed in a plastic container containing 20 liters of alkaline electrolyzed water with a pH of 13 and stirred for 2 hours while heating to 60° C. in order to remove a strained layer on the particle surface. Subsequently, the silica powder was separated with a centrifugal separator, then washed with methanol and dried to obtain a silica powder LK-2. This silica powder had a dielectric loss tangent of 0.0003 and a hydroxy group content of 240 ppm.

Example 3

5 Kg of a silica powder C (EMIX-100 manufactured by Tatsumori Ltd.) with an average particle size of 0.1 μm, a dielectric loss tangent of 0.0053, and a hydroxy group content of 475 ppm was placed in an alumina container and heated in a muffle furnace (manufactured by AS ONE Corporation) in air at 900° C. for 12 hours, and then cooled to room temperature over 6 hours. The silica powder after the heat treatment was placed in a plastic container containing 20 liters of alkaline electrolyzed water with a pH of 13 and stirred for 2 hours while heating to 60° C. in order to remove a strained layer on the particle surface. Subsequently, the silica powder was separated with a centrifugal separator, then washed with methanol and dried to obtain a silica powder LK-3. This silica powder had a dielectric loss tangent of 0.0004 and a hydroxy group content of 135 ppm.

Example 4

5 Kg of a silica powder A1 (RS8225 manufactured by Tatsumori Ltd.) with an average particle size of 15 μm and a dielectric loss tangent of 0.0006 was placed in an alumina container and heat-treated in a muffle furnace (manufactured by AS ONE Corporation) at the temperature, time and atmosphere shown in Table 3. After heating, the resultant was cooled to room temperature over 6 hours to obtain silica powders LK-4, LK-5, LK-6, LK-7, and LK-8 (Examples 4-1 to 4-5). The heat-treated silica powder was disintegrated with a ball mill, and coarse particles were eliminated with a 150-mesh sieve. The dielectric loss tangent at 10 GHz and the hydroxy group content of each resulting silica powder were measured and are shown in Table 3.

Comparative Example 1

5 Kg of a silica powder A1 (RS8225 manufactured by Tatsumori Ltd.) with an average particle size of 15 μm and a dielectric loss tangent of 0.0006 was placed in an alumina container and heated in a muffle furnace (manufactured by AS ONE Corporation) in air at 400° C. for 12 hours, and then cooled to room temperature over 6 hours. The silica powder after heat treatment was placed in a plastic container containing 20 liters of alkaline electrolyzed water with a pH of 13 and stirred for 2 hours while heating to 60° C. in order to remove a strained layer on the particle surface. Subsequently, the silica powder was separated with a centrifugal separator, then washed with methanol and dried. The dried silica powder was disintegrated with a ball mill, and coarse particles were eliminated with a 150-mesh sieve. This silica powder had a dielectric loss tangent of 0.0006, and no improvement in dielectric loss tangent was seen. The hydroxy group content was 355 ppm.

Comparative Example 2

5 Kg of a silica powder A1 (RS8225 manufactured by Tatsumori Ltd.) with an average particle size of 15 μm and a dielectric loss tangent of 0.0006 was placed in an alumina container and heated in a muffle furnace (manufactured by AS ONE Corporation) in air at 1600° C. for 12 hours, and then cooled to room temperature over 6 hours. The heat-treated silica powder was partly fused, and could not be disintegrated.

Comparative Example 3

5 Kg of a silica powder A1 (RS8225 manufactured by Tatsumori Ltd.) with an average particle size of 15 μm and a dielectric loss tangent of 0.0006 was placed in an alumina container and heated in a muffle furnace (manufactured by AS ONE Corporation) in air at 900° C. for 10 minutes, and then cooled to room temperature over 6 hours. This silica powder had a dielectric loss tangent of 0.0006, and no improvement in dielectric loss tangent was seen. The hydroxy group content was 365 ppm.

TABLE 2

| | Silica powder | Example 1 LK-1 | Example 2 LK-2 | Example 3 LK-3 | Comparative Example 1 CE-1 | Comparative Example 2 CE-2 | Comparative Example 3 CE-3 |
|---|---|---|---|---|---|---|---|
| Before heat treatment | Average particle size (μm) | 15 | 1.5 | 0.1 | 15 | 15 | 15 |
| | Dielectric loss tangent (10 GHz) | 0.0006 | 0.0011 | 0.0053 | 0.0006 | 0.0006 | 0.0006 |
| | Hydroxy group (ppm) | 370 | 290 | 475 | 370 | 370 | 370 |
| Heat treatment | Heating temperature (° C.) | 900 | 900 | 900 | 400 | 1600 | 900 |
| | Heating time (Hr) | 5 | 12 | 12 | 12 | 12 | 10 min |
| | Atmosphere | In air | In air | In air | In air | In air | In air |
| Etching treatment | Etching solution | Alkaline electrolyzed water | Alkaline electrolyzed water | Alkaline electrolyzed water | Alkaline electrolyzed water | — | — |
| | Treatment temperature (° C.) | 60 | 60 | 60 | 60 | — | — |
| | Treatment time (Hr) | 2 | 2 | 2 | 2 | — | — |
| Silica powder | Dielectric loss tangent (10 GHz) | 0.0002 | 0.0003 | 0.0004 | 0.0006 | — | 0.0006 |
| | Hydroxy group (ppm) | 270 | 240 | 135 | 355 | — | 365 |

TABLE 3

| | | Example 4 | | | | |
|---|---|---|---|---|---|---|
| | Silica powder | 1 LK-4 | 2 LK-5 | 3 LK-6 | 4 LK-7 | 5 LK-8 |
| Before heat treatment | Average particle size (μm) | 15 | 15 | 15 | 15 | 15 |
| | Dielectric loss tangent (10 GHz) | 0.0006 | 0.0006 | 0.0006 | 0.0006 | 0.0006 |
| | Hydroxy group (ppm) | 370 | 370 | 370 | 370 | 370 |
| Heat treatment | Heating temperature (° C.) | 600 | 750 | 900 | 1000 | 1200 |
| | Heating time (Hr) | 12 | 12 | 5 | 8 | 3 |
| | Atmosphere | In air | In air | In air | In nitrogen | In nitrogen |
| | Dielectric loss tangent (10 GHz) | 0.0004 | 0.0003 | 0.0002 | 0.0002 | 0.0002 |
| | Hydroxy group (ppm) | 300 | 285 | 275 | 230 | 220 |

Examples 5 to 7 and Comparative Example 4

A resin composition was prepared in the following manner, and the dielectric loss tangent of a cured material of the obtained resin composition was measured. Table 4 shows the results.

Example 5

65 parts by mass of a cresol novolak type epoxy resin (EOCN1020 manufactured by Nippon Kayaku Co., Ltd.), 35 parts by mass of a phenol novolak resin (H-4 manufactured by Gun Ei Chemical Industry Co., Ltd.), 400 parts by mass of LK-1 (heated and etched silica powder) of Example 1, 0.2 parts by mass of a catalyst TPP (triphenylphosphine manufactured by Hokko Chemical Industry Co., Ltd.), and 0.5 parts by mass of a silane coupling agent (KBM403 manufactured by Shin-Etsu Chemical Co., Ltd.) were sufficiently mixed with a high-speed mixing apparatus, then heated and kneaded with a continuous kneading apparatus, formed into a sheet, and cooled. The sheet was pulverized to obtain a granular powder, and a thermosetting resin composition containing an epoxy resin was obtained. This composition was transfer-molded under curing conditions of 175° C. and 2 minutes and cured. A resultant material was further post-cured at 180° C. for 2 hours to give a cured material. When this cured material was broken and the interface between the silica and the resin in the broken-out section (FIG. 2) was observed, the resin and the silica powder were strongly bonded, and therefore, silica powder cannot be seen in the broken-out section, and most of the breakage is in the resin portion. The cured material had a favorable dielectric loss tangent of 0.004.

Example 6

65 parts by mass of a cresol novolak type epoxy resin (EOCN1020 manufactured by Nippon Kayaku Co., Ltd.), 35 parts by mass of a phenol novolak resin (H-4 manufactured by Gun Ei Chemical Industry Co., Ltd.), 400 parts by mass of LK-6 (heat-treated and unetched silica powder) of Example 4, 0.2 parts by mass of a catalyst TPP (triphenylphosphine manufactured by Hokko Chemical Industry Co., Ltd.), and 0.5 parts by mass of a silane coupling agent (KBM403 manufactured by Shin-Etsu Chemical Co., Ltd.) were sufficiently mixed with a high-speed mixing apparatus, then heated and kneaded with a continuous kneading apparatus, formed into a sheet, and cooled. The sheet was pulverized to obtain a granular powder, and a thermosetting resin composition containing an epoxy resin was obtained.

This composition was transfer-molded under curing conditions of 175° C. and 2 minutes and cured. A resultant material was further postcured at 180° C. for 2 hours to give a cured material. When this cured material was broken and the interface between the silica powder and the resin in the broken-out section (FIG. 3) was observed, no resin was adhered to the silica powder surface, and the breakage was at the interface between the silica powder and the resin. The cured material had a favorable dielectric loss tangent of 0.004.

Example 7

100 parts by mass of SLK-3000 (manufactured by Shin-Etsu Chemical Co., Ltd.), being a low dielectric maleimide resin, 400 parts by mass of LK-6 of Example 4, and as a curing agent, 2 parts by mass of dicumyl peroxide (Percumyl D manufactured by NOF Corporation), being a radical polymerization initiator, were mixed in 150 parts by mass of an anisole solvent. This was dispersed and dissolved to prepare a maleimide resin composition varnish. Next, the resultant was spread to a thickness of 200 mm with a bar coater, placed in a dryer at 80° C. for 30 minutes to remove the anisole solvent. Thus, an uncured maleimide resin composition was prepared.

The prepared uncured maleimide resin composition was placed in a mold of 60 mm×60 mm×100 μm, cured with a hand press at 180° C. for 10 minutes at 30 MPa, and then completely cured in a dryer at 180° C. for 1 hour to fabricate a cured resin sheet. Using this cured resin sheet, the dielectric loss tangent was measured. The cured material had a dielectric loss tangent of 0.0007, and was more favorable than a product with untreated silica powder A1 blended.

Comparative Example 4

65 parts by mass of a cresol novolak type epoxy resin (EOCN1020 manufactured by Nippon Kayaku Co., Ltd.), 35 parts by mass of a phenol novolak resin (H-4 manufactured by Gun Ei Chemical Industry Co., Ltd.), 400 parts by mass of silica powder A1 (unheat-treated silica powder RS8225 manufactured by Tatsumori Ltd.), 0.2 parts by mass of a catalyst TPP (triphenylphosphine manufactured by Hokko Chemical Industry Co., Ltd.), and 0.5 parts by mass of a silane coupling agent (KBM403 manufactured by Shin-Etsu Chemical Co., Ltd.) were sufficiently mixed with a high-speed mixing apparatus, then heated and kneaded with a continuous kneading apparatus, formed into a sheet, and cooled. The sheet was pulverized to obtain a granular powder, and a thermosetting resin composition containing an epoxy resin was obtained.

This composition was transfer-molded under curing conditions of 175° C. and 2 minutes and cured. A resultant material was further postcured at 180° C. for 2 hours to give a cured material. When this cured material was broken and the interface between the silica and the resin in the broken-out section (FIG. 4) was observed, cohesive failure had occurred in the resin at the interface between the silica and the resin. The cured material had a dielectric loss tangent of 0.005, which was poor compared with the products of the present invention (Examples 5 and 6).

Comparative Example 5

100 parts by mass of SLK-3000 (manufactured by Shin-Etsu Chemical Co., Ltd.), being a low dielectric maleimide resin, 400 parts by mass of silica powder A1 (RS8225 manufactured by Tatsumori Ltd.), and as a curing agent, 2 parts by mass of dicumyl peroxide (Percumyl D manufactured by NOF Corporation), being a radical polymerization initiator, were mixed in 150 parts by mass of an anisole solvent. This was dispersed and dissolved to prepare a maleimide resin composition varnish. Next, the resultant was spread to a thickness of 200 mm with a bar coater, placed in a dryer at 80° C. for 30 minutes to remove the anisole solvent. Thus, an uncured maleimide resin composition was prepared.

The prepared uncured maleimide resin composition was placed in a mold of 60 mm×60 mm×100 μm, cured with a hand press at 180° C. for 10 minutes at 30 MPa, and then completely cured in a dryer at 180° C. for 1 hour to fabricate a cured resin sheet. Using this cured resin sheet, the dielectric loss tangent was measured. The cured material had a dielectric loss tangent of 0.001, which was poor compared with the product of the present invention (Example 7).

TABLE 4

| | | Example 5 | Example 6 | Example 7 | Comparative Example 4 | Comparative Example 5 |
|---|---|---|---|---|---|---|
| Silica powder | LK-1 | 400 | | | | |
| | LK-6 | | 400 | 400 | | |
| | A1 | | | | 400 | 400 |
| Resin | Cresol novolak type epoxy resin EOCN1020 | 65 | 65 | | 65 | |
| | Phenol novolak resin H-4 | 35 | 35 | | 35 | |
| | Maleimide resin SLK-3000 | | | 100 | | 100 |
| Catalyst/ curing agent | T2P | 0.2 | 0.2 | | 0.2 | |
| | Percumyl D | | | 2 | | 2 |
| Silane coupling agent | KBM403 | 0.5 | 0.5 | | 0.5 | |
| Solvent | Anisole | | | 150 | | 150 |
| Cured material of resin composition | Dielectric loss tangent (10 GHz) | 0.004 | 0.004 | 0.0007 | 0.005 | 0.001 |

The blended amount of each component in the Table is in parts by mass.

As clearly shown in Tables 2 and 3, the inventive silica powder (Examples 1 to 3 and Examples 4-1 to 4-5) has a considerably lowered dielectric loss tangent (tan δ) compared with untreated silica powder. On the other hand, with a low heat treatment temperature (Comparative Example 1)

or insufficient heat treatment (a short treatment time) (Comparative Example 3), no improvement in dielectric loss tangent was seen. Meanwhile, if the heat treatment temperature is too high, the silica powder becomes partially fused, and cannot be disintegrated (Comparative Example 2). The dielectric loss tangent can be improved sufficiently with a heat treatment atmosphere of air or nitrogen. When a high-temperature treatment is performed in a nitrogen atmosphere, the number of hydroxy groups in the powder tends to decrease further (Examples 4-4 and 4-5). As described, by subjecting the silica powder to an appropriate heat treatment, a silica powder with a desirable low dielectric loss tangent can be obtained.

It is revealed from the results of Example 1 (LK-1) and Example 4-3 (LK-6), that the dielectric loss tangent and the hydroxy group amount of the powder hardly change before and after the etching treatment. On the other hand, when the cured material of the composition obtained by blending each powder in resin was broken and the broken-out section was observed, breakage was largely observed in the resin portion in the former (Example 5) since the resin and the silica powder are strongly bonded, whereas in the latter (Example 6), the breakage was occurred at the interface between the silica powder and the resin. From the above, it is revealed that an etching treatment has the effect of improving the strength of adhesion to resin while hardly affecting the dielectric loss tangent of the powder after the heat treatment.

In addition, it is revealed from Examples 6 and 7 that by using a resin composition having the inventive low dielectric silica powder blended in a low dielectric resin, the dielectric loss tangent of a cured material can be lowered easily.

Furthermore, considering the results of Example 6 and Comparative Example 4, and Example 7 and Comparative Example 5, it can be understood that by using a resin composition having heat-treated low dielectric silica particles blended, the dielectric loss tangent of a cured material can be lowered easily.

Conventionally, it has been known that low silanol silica can be obtained by heat-treating. However, it was thought that if silica powder is treated at a high temperature, a strained layer is formed on the surface, and the strength of a cured material of a resin composition having a heat-treated silica powder loaded becomes degraded. Therefore, heat-treated silica powder that can be used in a filler, where the adhesive strength with resin is important, has not been put to practical use.

However, it was found out for the first time by the study of the present inventors, that sufficient strength can be achieved even when a resin composition obtained by blending heat-treated silica particles in resin is cured. In addition, it has also been found that the dielectric loss tangent of a cured material can be easily lowered by a heat treatment. Furthermore, it has also been found out for the first time by a further study of the present inventors, that the strained layer on the silica powder surface can be easily removed by immersing in an etching solution as described above. Combining a heat treatment and an etching treatment broadens the range of selection of raw material silica powder and contributes to lowering cost, and at the same time, a silica powder (etched silica powder) with a low dielectric loss tangent and favorable adhesion to resin can be manufactured efficiently. As described, according to the inventive method for manufacturing low dielectric silica, a silica powder with a low dielectric loss tangent and a strong adhesion at the interface to resin can be manufactured with high productivity, and therefore, the method has a high industrial value.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A low dielectric silica powder, which has an average particle size of 0.1 to 30 μm and a dielectric loss tangent of 0.0005 or less at 10 GHz, wherein the low dielectric silica powder has, inside and on a surface thereof, 200 ppm or less of a metal and/or a metal oxide in terms of mass of each metal, the metal selected from aluminum, magnesium, and titanium, and 10 ppm or less of an alkali metal and an alkaline earth metal in terms of mass of each, wherein a hydroxy group (Si—OH) content of the low dielectric silica powder is from 135 ppm or more to 300 ppm or less in terms of mass, wherein the hydroxy group content is quantified by measuring the transmittance of a peak near 3680 $cm^{-1}$ by infrared spectroscopic analysis, and wherein the hydroxy group is inner silanol.

2. The low dielectric silica powder according to claim 1, wherein boron content is 1 ppm or less, phosphorus content is 1 ppm or less, and uranium and thorium contents are each 0.1 ppb or less.

3. A low dielectric silica powder-containing resin composition, being a mixture of the low dielectric silica powder according to claim 1.

* * * * *

UNITED STATES PATENT AND TRADEMARK OFFICE
CERTIFICATE OF CORRECTION

PATENT NO. : 12,098,290 B2
APPLICATION NO. : 17/321827
DATED : September 24, 2024
INVENTOR(S) : Toshio Shiobara et al.

Page 1 of 1

It is certified that error appears in the above-identified patent and that said Letters Patent is hereby corrected as shown below:

On the Title Page

After item (65), insert item (30):
--(30) Foreign Application Priority Data
June 2, 2020 (JP).......................................2020-96051--

Signed and Sealed this
Eighth Day of April, 2025

Coke Morgan Stewart
*Acting Director of the United States Patent and Trademark Office*